Jan. 11, 1966 W. C. A. CARLSON ET AL 3,229,155
ELECTRIC ARC DEVICE FOR HEATING GASES
Filed Dec. 20, 1960 3 Sheets-Sheet 1

WILLIAM C. A. CARLSON
CARL E. SORENSEN
INVENTORS

BY
ATTORNEYS

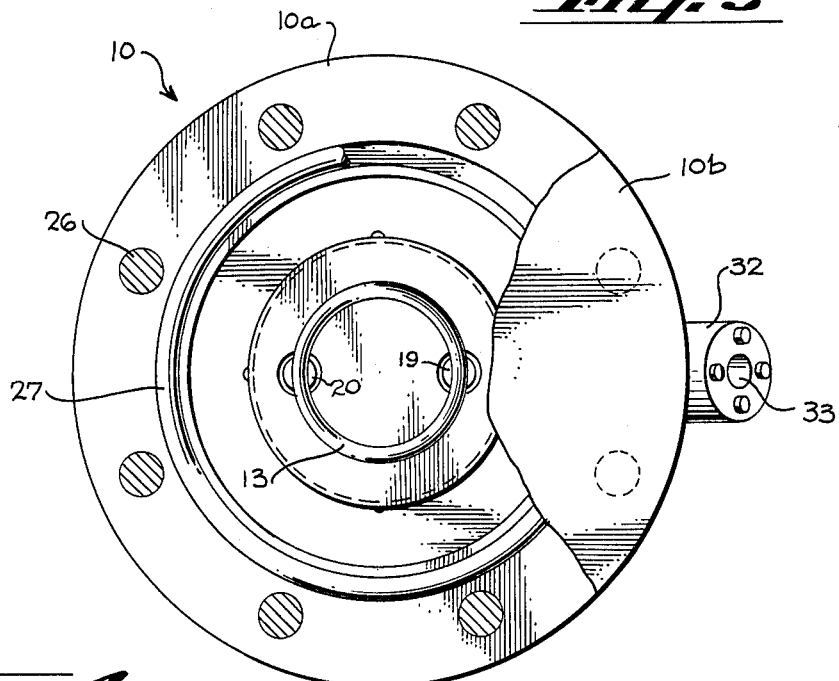
Fig. 3
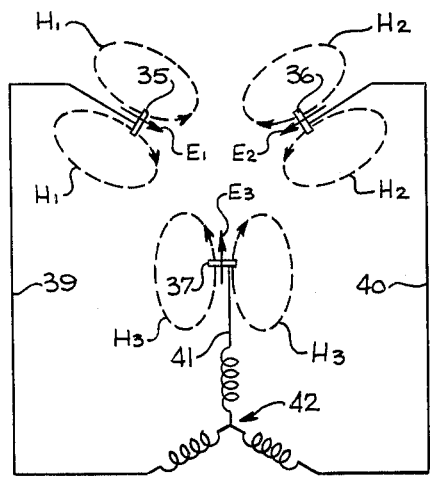
Fig. 4
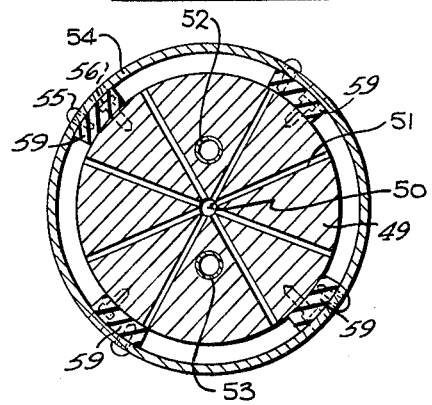
Fig. 9
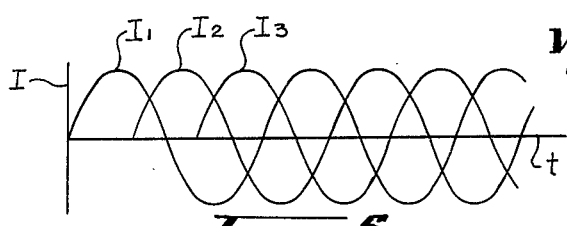
Fig. 5
WILLIAM C. A. CARLSON
CARL E. SORENSEN
INVENTORS
BY 
ATTORNEYS

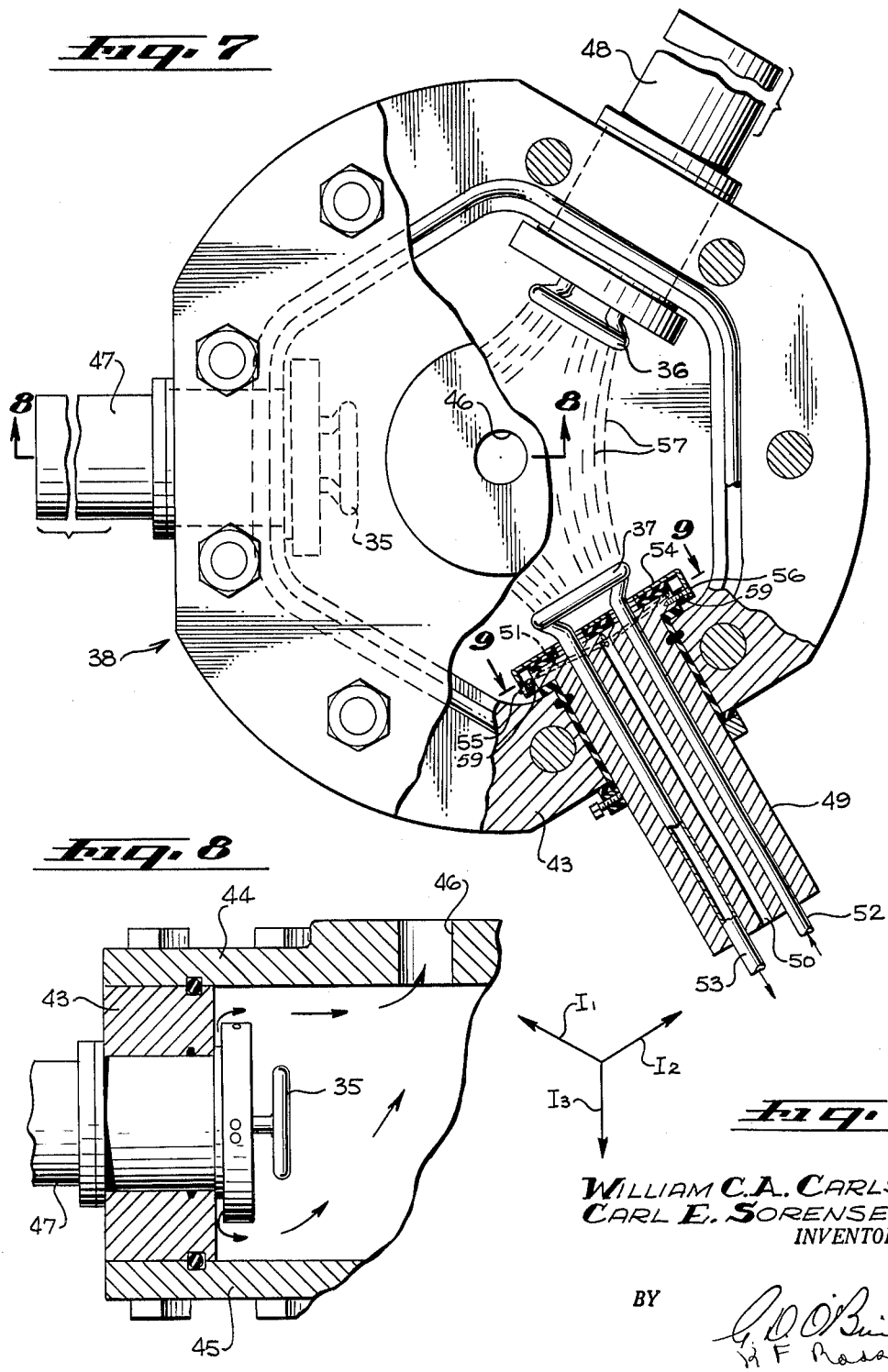

United States Patent Office 3,229,155
Patented Jan. 11, 1966

3,229,155
ELECTRIC ARC DEVICE FOR HEATING GASES
William C. A. Carlson, Sunnyvale, and Carl E. Sorensen, Saratoga, Calif., assignors to the United States of America as represented by the Administrator of the National Aeronautics and Space Administration
Filed Dec. 20, 1960, Ser. No. 77,251
6 Claims. (Cl. 315—111)
(Granted under Title 35, U.S. Code (1952), sec. 266)

The invention described herein may be manufactured and used by or for the Government of the United States of America for governmental purposes without the payment of any royalties thereon or therefor.

This invention relates to an electric arc device. More particularly, this invention relates to means for minimizing electrode ablation and increasing the efficiency of such a device intended for heating gases or plasmas to extremely high temperatures which may, for example, be from 10,000° K. to 50,000° K.

Electric arc discharge devices for heating gases afford advantages of easy control of energy levels and temperature ranges not attainable with other heating means. In the past, however, such electric arc gas heating devices have had a very high rate of contamination due to the ablation of electrode materials. Of course, such ablation also leads to a significant amount of down time necessary to replace the electrodes which are consumed.

In related electric arc discharge apparatus, such as electric wind generators and nitrogen fixation devices, attempts have been made to reduce electrode ablation by applying a magnetic field normal to the current flowing in the arc. This crossed field effect puts a physical force on the arc as it would on a conductor and this causes the arc to move with respect to the electrode. In such devices, however, it has in the past been difficult to achieve sufficient relative velocity between the electrode surface and an arc of the power level necessary to achieve significantly high temperatures to prevent melting of the electrode surface.

In view of these difficulties attempts have been made to use chemical processes and atomic or nuclear processes rather than electric arcs for attaining high temperatures in gases. Chemical processes, however, are limited in temperature to a considerably lower range than the above noted 10,000 to 50,000° K. which can be achieved by the device described herein. Atomic or nuclear devices, on the other hand, can produce temperatures considerably in excess of those produced by the present device, but are not easily controllable, are more expensive and dangerous to operate, and produce high temperatures which exist only for very very short periods of time.

It is therefore an object of this invention to provide an electric arc device having means to minimize the electrode ablation thereof and to improve the efficiency thereof.

It is a further object of this invention to provide such an electric arc discharge device capable of efficiently heating gases to relatively high temperatures.

It is yet another object of this invention to provide an electric arc device with means to establish a magnetic field having a major component parallel to the electric field gradient of the arc to produce a multiple spot diffused arc.

It is a still further object of this invention to provide an electric arc discharge device wherein a multiple spot diffused arc is continuously moved in order to reduce electrode ablation and improve heating efficiency.

Briefly, in accordance with one aspect of this invention, a device is provided which is capable of heating gases at a volumetric rate and to a temperature suitable for use in supplying gas to a supersonic or hypersonic wind tunnel. The gases are heated as they pass through the region of an electric arc struck between two or more electrodes. A magnetic field is generated at each electrode by a solenoid coil having an axis parallel to the direction of arc discharge from the electrode. The resulting magnetic field has a major vector component which is parallel to the electric field gradient at the electrode surface and which has been found to produce a diffuse or multiple spot arc so that even instantaneously the power in the arc is more uniformly distributed over a large electrode area than is the case with the conventional single spot arc. Furtherfore, the magnetic field is generated in such a fashion as to produce fringing components which are normal to the electric field gradient and therefore cause the multiple spot diffuse arc to rotate. This rotation of a diffuse arc further reduces electrode ablation and further increases heating efficiency. The electrodes are preferably spaced equiangularly in a confined chamber, there being two electrodes for a D.C. supply and $n$ electrodes for an n-phase supply. The hot gases which are the end product of the device are available at the center of the chamber or container which can therefore be made as small as practical for the number of phases to be used so that the losses of the container from the hot gases are thereby reduced and the efficiency of the device even further increased by comparison with known devices.

These and other objects and advantages of the invention will be more fully apparent to those skilled in the art from the following detailed description of exemplary embodiments thereof as shown in the drawings wherein:

FIG. 3 is a plan view, partially in section, taken on the line 3—3 of FIG. 2;

FIGS. 4, 5 and 6 are diagrammatic views illustrating the circuit for and the relationships of the currents in a three-phase embodiment of the invention;

FIG. 7 is a plan view, partially in section, showing the mechanical details of the practical embodiment of the three-phase device;

FIG. 8 is a fragmentary sectional view taken on the line 8—8 of FIG. 7 and particularly illustrating the flow of gas to be heated in the device; and FIG. 9 is a sectional view taken on the line 9—9 of FIG. 7 and showing the radial gas passages in the end of the magnetic pole piece mounting the electrode.

Figure 1:
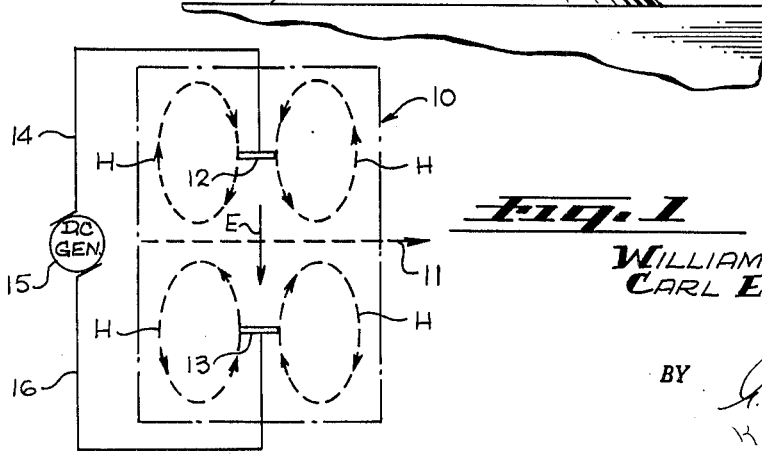
FIG. 1 is a schematic circuit diagram of a first embodiment of the invention using a D.C. supply.

Turning now to the drawing and more particularly to FIG. 1 thereof, there is shown a schematic circuit diagram of one embodiment of the invention. A generally enclosed chamber 10 is schematically indicated by the dash-dot line in FIG. 1. Air to be heated is channeled through the chamber 10 as indicated schematically by the arrow 11.

An opposed spaced pair of electrodes 12 and 13 are mounted inside the chamber 10. Electrode 12 is connected by a conductor 14 to one side of a D.C. generator 15 whereas the electrode 13 is connected by a conductor 16 to the other side of generator 15. The D.C. generator 15 establishes a potential difference between the electrodes 12 and 13. This electric field gradient is indicated in FIG. 1 by the vector E. In practice, of course, the electric field is of sufficient magnitude to maintain an arc discharge between the electrodes 12 and 13. A thin starting wire S is preferably connected between electrodes 12 and 13 to aid in igniting and starting the arc discharge. Of course the wire S quickly melts in the heat of the arc and is replaced after each run. Alternatively, the discharge may be started in any other convenient manner.

In practice it has been typical to use an electric field gradient of 50 to 60 volts per inch. This gradient plus the electrode drop in a preferred embodiment of the invention has resulted in a potential difference of about 250 volts between the electrodes 12 and 13 with approximately 3,000 amperes of current flowing in the arc.

Magnetic fields are established at each electrode as indicated schematically by the arrows H in FIG. 1. These fields, as will be discussed in detail below, can be established by any convenient means such as an electromagnetic coil having its axis in a direction such that the field generated thereby has the direction indicated by the arrows H in FIG. 1. From this figure it will be noted that the magnetic field is applied to the arc between the electrodes in such a fashion that the magnetic field has its major component parallel to the electric field of the arc at the surface of the electrodes. The magnetic field in fact typically has a field strength in the range of 400 to 1500 gauss.

It has been found experimentally that where a magnetic field is applied to an arc discharge in such a fashion that the magnetic field has a major component parallel to the principal component of the electric field vector, the result is to change the normal single arc discharge into a discharge of a multiple spot or multiple arc type. That is to say, where the electrodes 12 and 13, for example, are ring electrodes, the arc at any given instant will originate from and terminate on a plurality of separate discrete spots on each of the electrodes respectively. From FIG. 1 it will be noted that the magnetic fields H applied to the opposed electrodes are in bucking or opposed relationship so that near the center of the arc the field lines become perpendicular to the electric vector E of the arc. Of course, the perpendicular relationship will produce a driving or turning force on the various components of the multiple spot arc. Consequently, in the arrangement schematically shown in FIG. 1 the multiple spot arc will be caused to rotate as a whole.

It should be noted that even if the magnetic fields applied to the opposed electrodes are in aiding rather than opposed relationship, there will in practice normally be sufficient fringing of magnetic flux to produce the desired rotation of the arc.

Figure 2:
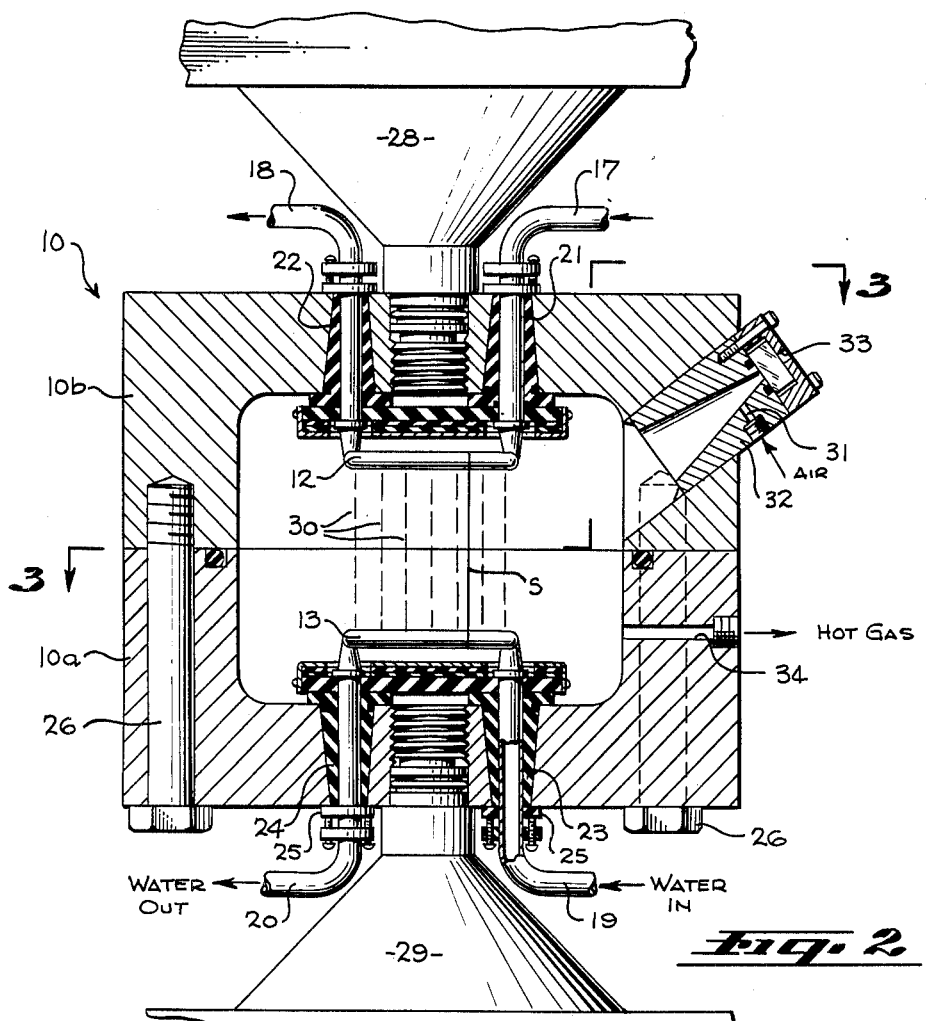
FIG. 2 is a central vertical sectional view of a gas heating chamber of the type schematically shown in FIG. 1.

In FIG. 2 there is shown a central vertical sectional view of a gas heating apparatus of the type schematically shown in FIG. 1. The apparatus of FIG. 2 is shown in further detail on the partially sectioned plan view of FIG. 3 which is taken on line 3—3 of FIG. 2. From FIGS. 2 and 3 it will be noted that the tubular ring shaped electrodes 12 and 13 are positioned in spaced opposed relationship to each other on the upper and lower walls respectively of the chamber 10. The electrodes 12 and 13 are of hollow tubular construction to permit cooling water to flow through the bore of the electrode. Any convenient connection means (not shown) is used to supply water to one leg 17 of the electrode 12. The water then flows through leg 17, thence through the hollow electrode 12 itself, and thence out through the leg 18.

The lower electrode 13 is similarly provided with a water inlet leg 19 and a water outlet leg 20. The legs 17, 18, 19 and 20 are mounted in insulating wedges 21, 22, 23 and 24 respectively which are secured in gas tight relationship in the walls of the chamber 10. The insulating wedges and the electrode assemblies positioned therein are secured in position by a lock nut arrangement such as that shown at 25.

It will be noted that the shape of the insulating wedge 23 prevents the assembly of the electrode 13 from moving outwardly with respect to the wall of the lower portion 10a of chamber 10, whereas the lock nut assembly 25 prevents the leg 19 from moving inwardly with respect to this wall. Of course, a similar lock nut arrangement is provided as may be seen in the drawings for each of these electrode legs 17, 18, 19 and 20.

It will further be understood, of course, that the electrode legs 17 and 18 are electrically connected in parallel to any suitable conductor 14 (not shown in FIG. 2) in a manner such as is illustrated schematically in FIG. 1, whereas the electrode legs 19 and 20 of electrode 13 are similarly connected in parallel to a conductor such as the conductor 16 shown in FIG. 1 so that the D.C. generator 15 may establish a direct current electrical potential difference or gradient between the electrodes 12 and 13.

As will be noted from FIGS. 2 and 3, the generally cylindrical chamber 10 comprises two symmetrical mating sections 10a and 10b both of which are substantially half cylinders. The electrode 12 is mounted in the end wall of the upper half 10b and the electrode 13 is mounted in the end wall of the lower half of 10a. The two portions of the chamber 10 may be joined together by any convenient means such as the bolts 26. In the embodiment shown there are eight of these bolts circumferentially spaced around the wall of the cylinder. The joint between the upper and lower halves of the chamber is conveniently sealed by annular O-ring 27 positioned in a recess in the lower portion 10a of the chamber as shown.

A magnetic pole piece 28 is threadedly received in the upper end wall of portion 10b of the chamber while a similar magnetic pole piece 29 is threadedly received in the lower end wall of portion 10a of the chamber.

It will be noted that these pole pieces are positioned so that their longitudinal axis is in the center of the ring electrodes 12 and 13 and is aligned with the longitudinal axis of the electrode assembly where this latter axis is considered to be parallel to the legs and midway between them. The magnetic pole pieces 28 and 29 may if desired be permanent magnets. As shown, however, it is intended that they will carry externally of the chamber 10 a conventional electromagnetic winding (shown only in outline) which will generate magnetic fields having a flux distribution pattern such as is shown in the schematic diagram of FIG. 1. From this it will be noted that the magnetic field has a major component perpendicular to the plane of the ring electrodes itself and therefore parallel to the electric field gradient at the surface of the electrodes.

As noted above, the substantial parallelism of the electric and magnetic fields in such an arc discharge arrangement produces a multiple spot or multiple arc discharge as indicated in FIG. 2 by the plurality of dashed lines 30. Of course it will be understood that the dashed lines 30 are in a sense merely a schematic arrangement since the exact number of separate arc paths will vary as between different specimens of the apparatus and as between different operating conditions of the same specimen. In all instances, however, it should be noted that the power supplied to the electrodes is divided between a plurality of separate arcs. Therefore, for a given amount of input power which will produce a given temperature increase in the specified flow of gas through the chamber, the electrode ablation is materially reduced by virtue of the distribution of this power among a plurality of arcs. Furthermore, it appears that the diffusion into a plurality of arcs also improves the heat transfer in practical devices. As noted above, the plurality of arcs 30 are also caused to rotate by the tangential perpendicular component of the magnetic field thereby further reducing electrode ablation.

It will of course be understood that the chamber 10 is provided with a suitable inlet and outlet means by which gas may be flowed therethrough. As shown in FIG. 2, the gas is admitted through a passage 31 in the wall of a viewing port arrangement which may be provided so that the operator can observe visually the state of the arc. The viewing port comprises the insertable plug 32 which bears a heavy glass window 33 in the end wall thereof. The channel 31 for the incoming air to be heated may conveniently open into the expanding area of the bore of the plug 32 which leads directly into the interior of the chamber 10.

A hot gas outlet passage 34 is provided in the side wall of the lower portion 10a of the chamber. Passage 34 has an enlarged bore at its outer end which is threaded to receive any convenient outlet connection. Of course it will be understood that the viewing port is not a necessary element in the arc heating device and that in different embodiments various other arrangements of air flow may be utilized in accordance with the requirements of a particular application.

Gas to be heated is flowed through the arc discharge in the chamber 10 at any pressure suitable for a particular application. That is to say, the pressure in the chamber may be either less than or greater than atmosphere depending upon the nature of the gas and its intended use. The pressure can be controlled by any suitable external pumping means (not shown).

In FIGS. 4 through 9 there is illustrated a second embodiment of the invention utilizing a three-phase alternating current supply rather than a direct current supply and also utilizing a different type of air flow arrangement. FIGS. 4, 5 and 6 are schematic and diagrammatic showings of the electrical circuitry and electrical relationships of the three-phase embodiment.

In FIG. 4 there is schematically shown the electrical current connection of three electrodes 35, 36 and 37 which are equiangularly positioned on the inner side walls of a right hexagonal cylindrical chamber 38 as may be seen more clearly in FIG. 7. Of course it will be understood that the physical positioning of the electrodes can be varied and the chamber could in fact be a right circular cylinder, a tube, or any other convenient shape. It is however preferred to space any given number of electrodes of a polyphase system equiangularly in a symmetrical chamber in order to achieve uniformity of arc discharge and of heating effect. For example, if a six-phase system were used the electrodes could be positioned with one electrode on each surface of a cubical chamber.

As may be seen in FIG. 4, the electrodes 35, 36 and 37 are respectively connected by conductors 39, 40 and 41 to the Y-connected secondary winding 42 of a three-phase transformer the primary of which is connected to any suitable alternating current supply.

The electric field gradient at each of the electrodes 35, 36 and 37 respectively, is indicated by the arrows $E_1$, $E_2$ and $E_3$. The current flowing from these electrodes respectively, is indicated in the graph of FIG. 5 which is a plot of time as the abscissa versus currents as the ordinate. The current flowing from the electrode 35 as indicated by the curve $I_1$, that from electrode 36 by the curve $I_2$, and that from electrode 37 by the curve $I_3$. It will be noted that the three currents are substantially sine waves displaced 120 degrees from each other in time as is shown more clearly in the vector diagram of FIG. 6. As can be seen from FIG. 4, the electric field gradients $E_1$, $E_2$ and $E_3$ are perpendicular to the plane of the electrodes 35, 36 and 37 at and near the surface of the electrodes. The electric gradient pattern becomes more complicated near the center of the arc discharge area since the lines of force are necessarily curved between nonparallel electrodes. However, as noted, the gradient is clearly perpendicular to the plane of the electrode at and near its surface.

As is indicated in FIG. 4 by the dashed arrows $H_1$, $H_2$ and $H_3$ there is also provided for each electrode a means to generate the magnetic field indicated by the vector patterns $H_1$, $H_2$ and $H_3$. These magnetic fields have a major component parallel to the electric field gradients at the surface of the electrodes in order to produce the diffuse multiple spot arc discussed above. Again, at a distance from the surface of the electrode the magnetic fields turn to produce a component orthogonal to the electric field vector to thereby produce a force on the electric arc which causes it to move. The magnetic fields as shown in FIG. 4 are considered to be in opposed or bucking relationship in that each magnetic field has the same pole pointing inwardly into the arc discharge area within the chamber. As noted for the D.C. case, these fields can be in aiding rather than in opposed relationship where an even number of electrodes is used. However, in the three-phase or other odd phase number devices at least some of the magnetic fields are necessarily in opposition. Furthermore, it has been found that the opposed magnetic field relationship gives superior results in any embodiment.

A practical embodiment of the three-phase circuit illustrated schematically in FIGS. 4, 5 and 6 is shown in FIGS. 7, 8 and 9. In FIG. 7 it can be seen that the tubular ring electrodes 35, 36 and 37 are mounted in alternate side walls of the generally hexagonal right cylindrical chamber 38. The chamber 38 comprises the side wall member 43 (as seen in FIGS. 7 and 8) and the top and bottom wall members 44 and 45 respectively, which may be secured to the side wall 43 by bolts or any other convenient means. Conventional O-ring sealing means are provided to achieve a leak-proof chamber. The top member 44 of the chamber is provided with a central aperture 46 which functions as a heated gas outlet and to which any convenient conduit connection can be made.

As in the first embodiment, the electrodes 35, 36 and 37 are preferably tubular electrodes having water flowed therethrough for cooling purposes. The legs of these electrodes are mounted in magnetic pole pieces 47, 48 and 49 respectively. These pole pieces may be secured in and insulated from the side wall of the chamber 38 in any convenient manner as by the set screw arrangement shown in FIG. 7.

In the device shown in FIGS. 7 and 8, it is preferred to introduce the air to be heated through a central axial passage in the pole pieces supporting the electrodes. As shown by way of example, the electrode 37 has a central axial air conduit 50 in the pole piece 49. Air to be heated is introduced into the outer end of the conduit 50 and flows from conduit 50 into radial passages 51 in the inner end of the pole piece to thereby be discharged around the ring electrode. The radial passages 51 can be seen most clearly in FIG. 9. From FIGS. 7 and 9 it will be observed that the hollow tubular legs 52 and 53 which supply water to the ring electrode 37 are spaced on opposite sides of the central axial air passage 50 in the pole piece 49. The radial passages 51 extend outwardly from the central axial air passage 50 and the air passages further serve to place the cool incoming air in heat exchange relationship with the supporting pole piece to achieve both a limited amount of preheating of the air and, more importantly, a further cooling of the electrode structure. It will be noted that the air is deflected from the ends of the passages 51 by a flanged cap 54 which is secured to insulating blocks 59 by pairs of set screws 55 and 56.

The details of the electrode mounting structure for the electrode 37 have been discussed by way of example since each of the three electrodes is identical in its constructional details.

As can be seen more clearly from FIGS. 7 and 8, air which is introduced through the central axial passage 50 in each of the electrodes initially cools the electrode mounting structure, is then deflected back to the chamber wall and is flowed therefrom inwardly around the electrode toward the center of the chamber where it is heated by the arc discharge indicated in FIG. 7 by the dash lines 57.

It will be noted that the multiple spot diffuse arc 57 substantially occupies the entire central portion of the small cylindrical chamber 38. It is into this central portion that the air is discharged to be heated after leaving the baffles 54 on the electrode mounting blocks. After it has been heated the air flows, as indicated by the arrows in FIG. 8, upwardly and out through the central opening 46 where it may be fed by any convenient means to a wind tunnel or other point of ultimate use.

As noted in the connection with the D.C. embodiment, the mass rate of gas flow can be adjusted to maintain any desired pressure in the chamber.

It is thus seen there has been provided a device for producing gases or plasmas at extremely high temperatures which device is controllable in energy level and temperature range by controlling the electrical power input to the electrodes. As noted the device may be used either with direct current or polyphase alternating current input. In either embodiment an electric arc is struck between two or more electrodes and gases are heated as they pass through the region of the arc. The arc is split into a plurality of spots on the electrodes from which emanates a diffuse plurality of arcs and these diffused arcs are caused to rotate on the electrode surface by establishing a magnetic field parallel to the electric gradient of the arc at the surface of the electrode. This combined diffusion and rotation materially reduces electrode ablation to a level lower than has been obtainable with previous arrangements. This in turn prevents contamination of the gases by electrode materials and leads to more sustained and efficient operation.

It should be noted that in addition to the function of the magnetic field in diffusing and moving the arc, additional fields may be provided or the described fields may also be utilized to gain control or containment and guiding direction over both the arc and the resutling arc gases from the device. Normally such gases are ionized to a certain extent and can be controlled in their movement by the pattern of the magnetic field. As noted, the device produces a very diffuse multiple spot electric arc in the core of the chamber in which the arcs are struck. These spots, since they are multiple and are also being moved by the magnetic fields, result in almost no electrode ablation. Furthermore, the hot gases which are the end product of the device are available at the center of the device so that the container can be made as small as practical considering the number of phases to be used in order to reduce the losses of the container and to thereby further increase the efficiency in producing high temperature gases.

It will of course be understood that the details of structure and magnitude of operating parameters given above are merely typical examples and are not critical. Different voltages, currents, field strengths and pressures can be used. Furthermore, the embodiments shown are primarily intended for intermittent rather than continuous operation. For continuous operation the chamber should preferably be provided with water jacketing or other cooling means to prevent ablation of the inner side walls.

While particular exemplary embodiments of the invention have been described in principle and in detail above, it will be understood that various modifications thereof may be made without departing from the spirit of the invention as defined in the following claims.

What is claimed is:

1. An electric arc device for heating gases comprising: an enclosed chamber; a plurality of magnetic pole pieces extending into said chamber; a plurality of electrodes mounted in said chamber; each of said electrodes comprising a water-cooled tubular ring electrode mounted on one of said magnetic pole pieces, the plane of the surface of said electrode being perpendicular to the axis of said pole piece, said pole piece extending through the wall of said chamber and having an axial flow passage terminating in radial flow passages to introduce gas to be heated into said chamber and to cool said pole piece and electrode structure; means to apply an electric field to generate an electric arc between said ring electrodes; and means to establish a magnetic field in each of said pole pieces, said magnetic field having components parallel and transverse to said arc to diffuse and to rotate, respectively, said arc to minimize electrode ablation.

2. Apparatus as in claim 1 wherein there are three of said electrodes and said electric field generating means is a three-phase power supply.

3. An electric arc device for heating gases comprising: a chamber having a longitudinal axis; a plurality of annular electrodes each being symmetrical about a separate longitudinal axis, said electrodes being disposed within said chamber, said longitudinal axes of said electrodes defining a plane and all intersecting at said longitudinal axis of said chamber, said electrode axes being equally spaced about said chamber axis; means connected to said electrodes to establish arcs between adjacently disposed electrodes; means for cooling said electrodes; means in proximity to said electrodes to produce a magnetic field at each electrode, said magnetic field at each electrode having components parallel and transverse to the axis of that electrode and a flux density independent of arc current, said fields continuously rotating said arcs about said electrodes to minimize electrode ablation; and means for enabling gases to pass through said chamber near said electrodes.

4. An electric arc device for heating gases comprising: a chamber having a longitudinal axis; three water-cooled annular electrodes each symmetrical about a separate longitudinal axis, said electrodes being mounted within said chamber equidistant from said longitudinal axis of said chamber, said longitudinal axes of said electrodes defining a plane and intersecting said longitudinal axis of said chamber at one point; means connected to said electrodes to generate arcs between adjacently disposed electrodes; means in juxtaposition with said electrodes for generating a magnetic field at each electrode, said magnetic field at each electrode having components parallel and transverse to the axis of that electrode and a flux density independent of arc current, said fields causing said arcs to continuously rotate about said electrodes; means for admitting gases to the interior of said chamber near said electrodes; and means enabling the egress of heated gases.

5. An electric arc device for heating gases comprising: a chamber having a longitudinal axis; three annular electrodes each being symmetrical about a separate longitudinal axis, said electrodes being mounted within said chamber equidistant from said longitudinal axis of said chamber, said longitudinal axes of said electrodes intersecting to form a Y; means for cooling said electrodes; means connected to said electrodes to generate arcs between adjacently disposed electrodes; means in proximity to said electrodes to establish a magnetic field at each electrode, said magnetic field at each electrode having components parallel and transverse to the axis of that electrode and a flux density independent of arc current, said fields continuously rotating said arcs about said electrodes to minimize electrode ablation; and means for channeling gases through said chamber past said electrodes.

6. Apparatus as in claim 5 wherein said parallel components of said magnetic fields of said electrodes are in opposed relationship, and said arc generating means is a three-phase A.-C. power supply.

References Cited by the Examiner

UNITED STATES PATENTS

| | | | |
|---|---|---|---|
| 795,689 | 7/1905 | Carbone | 313—153 |
| 1,353,693 | 9/1920 | Yorke | 313—153 |
| 1,980,534 | 11/1934 | Kirsten | 315—98 |
| 2,040,215 | 5/1936 | Rava | 313—153 X |
| 2,116,393 | 5/1938 | Griffith | 313—157 X |
| 2,956,195 | 10/1960 | Luce | 313—162 X |
| 2,964,678 | 12/1960 | Read | 315—111 |
| 2,964,679 | 12/1960 | Schneider | 315—111 |
| 2,995,035 | 8/1961 | Bloxsom. | |
| 3,048,736 | 8/1962 | Emmerich | 313—161 |
| 3,097,321 | 7/1963 | Row et al. | 313—157 |

GEORGE N. WESTBY, *Primary Examiner.*

RALPH G. NILSON, ROBERT SEGAL, *Examiners.*

L. D. BULLION, P. C. DEMEO, *Assistant Examiners.*